COLOR DEMODULATOR

Filed Oct. 6, 1965

INVENTOR.
LIN KAO
BY Nicholas A. Camasto
ATTY.

United States Patent Office 3,354,265

Patented Nov. 21, 1967

3,354,265

COLOR DEMODULATOR

Lin Kao, Evanston, Ill., assignor to Admiral Corporation, Chicago, Ill., a corporation of Delaware Filed Oct. 6, 1965, Ser. No. 493,429
8 Claims. (Cl. 178—5.4)

ABSTRACT OF THE DISCLOSURE

A color demodulator of the twin pentode type where the common screen grid develops a $G-Y$ signal with an additional shadow grid interposed between the common screen grid and common control grid for substantially reducing the "capture effect" of the screen grid. The arrangement effectively raises the impedance of the screen grid and enables adequate $G-Y$ signal to be taken therefrom.

This invention relates to demodulators. More particularly, it relates to synchronous demodulators used to extract modulation information from received signals. Even more particularly, the invention relates to and will be described in the environment of the color modulation section of a color television receiver, which incorporates a high level demodulator for directly driving the picture tube.

A compatible color television signal contains luminance (brightness) information and color (hue and saturation) information. "Hue" denotes the actual color being televised, "saturation" denotes the relative whiteness of the color (e.g., pure red as opposed to pink), and "brightness" denotes the intensity of the light being reproduced, that is, its location in a scale wherein light (white) is at one extreme, and dark (black) is at the other.

A conventional color television camera "sees" only the red, blue and green components of the scene being televised. These three colors, the so called "primary colors," were chosen because, in the additive light system, almost the entire spectrum of perceptible colors can be reproduced by combining various proportions thereof.

The luminance information contained in a color television signal is obtained by matrixing 30% of the red, 11% of the blue and 59% of the green which is "seen" by the color television camera. This matrixing approximates the output of a monochrome television camera viewing the same scene and, therefore, the luminance information contained in a color television signal, when applied to a monochrome picture tube, will reproduce the original color scene in black and white. The luminance signal is commonly referred to as the "Y" signal.

The color reproduced upon the screen of a conventional three-gun color picture tube is determined by the amount of voltage applied to the control elements of each of three electron guns. For convenience, these electron or color guns are referred to as the red gun, the blue gun and the green gun. Each of the color guns activates corresponding color phosphors on the screen of the color picture tube. The tri-color phosphor screen and its associated shadow mask, as well as the details of mechanically prealigning the color guns and providing convergence of the electron beams, are well known in the art.

The luminance signal is conventionally applied to the cathode of each of the color guns and coacts with the voltage upon the grid of each gun to produce signals proportional to the amount of each of the three primary colors to be reproduced. The signals impressed upon the grids of the color guns, when combined with the luminance signal on the cathodes, must result in a signal representative of the actual color to be reproduced. For this reason, in the great majority of color sets, the signals coupled to the grids of the color guns are color difference signals, i.e., signals absent any brightness information. The color difference signals are commonly referred to as $R-Y$, $B-Y$ and $G-Y$, where R, B and G represent, respectively, the red, blue and green color signals and Y represents the luminance signal.

The color information is amplitude modulated upon a color subcarrier as two coded color signals, which signals are phase displaced one from the other. The color subcarrier is 3.58 mc. higher in frequency than the picture carrier. This 3.58 mc. color subcarrier is suppressed at the transmitter and must be reinserted at the receiver in order to retrieve the color information. Short bursts of 3.58 mc. signal are transmitted with the video information to enable a local color subcarrier oscillator to lock in, in proper phase, with the color subcarrier at the transmitter.

Although the color guns of the color picture tube receive red, blue and green color difference signals, the color information is transmitted, for reasons which are not pertinent to this discussion, as coded I and Q signals, the actual color difference signals being derived within the color television receiver. The I and Q signals and the luminance signal are related to the primary color signals by the following equations:

$$Y=0.3R+0.59G+0.11B \quad (1)$$

$$I=0.6R-0.32B-0.28G \quad (2)$$

$$Q=0.21R+0.31B-0.52G \quad (3)$$

Equations 2 and 3 show that I and Q are both functions of R, B and G. The I signal modulates the color subcarrier, delayed in phase by 57°, and the Q signal modulates this subcarrier 90° later. Since the I and the Q signals are definite functions of the primary color signals, using the I and Q signals to modulate the color subcarrier does not preclude extracting different signals within the receiver. This is effected by varying the axes of demodulation. By proper selection of the relative phase of the reference signal (i.e., the reconstituted subcarrier) for demodulation, either the I and Q signals, or any other set of signals can be recovered, which signals may then be matrixed to produce $R-Y$, $B-Y$ and $G-Y$ color difference signals.

In accordance with the invention, the red, blue and green color difference signals are obtained from the demodulator and directly applied to the picture tube color guns.

The invention discloses mens whereby the red and the blue color difference signals are derived from the anodes of the color demodulator tube at high level, and the green color difference signal is derived from a common "screen" electrode also at high level. The relationship of the green color difference signal to the red and blue color difference signals is obtained by solving Equation 1 for $G-Y$, which results in the following:

$$G-Y=-0.509(R-Y)-0.187(B-Y) \quad (4)$$

In accordance with the invention, a partial output from one of the anodes is fed back to the input of the demodulator and "reflexed" to achieve a high level $G-Y$ signal exactly as defined in Equation 4.

Consequently, it is an object of this invention to provide an improved high level color demodulator for color television receivers.

A further object of the invention is to provide synchronous demodulator means for obtaining three high level color difference signals directly from a color subcarrier, using a single twin hexode as the synchronous demodulator.

A still further object of the invention is to provide an improved synchronous demodulator which develops red, blue and green color difference signals of sufficient amplitude to directly drive the respective color guns of a color picture tube.

A further object of the invention is to provide an improved synchronous demodulator which will obviate the necessity of frequent adjustment of the color set grey scale.

Further objects of the invention will become evident to those skilled in the art by reading the specification in conjunction with the drawings in which.

Figure 1:
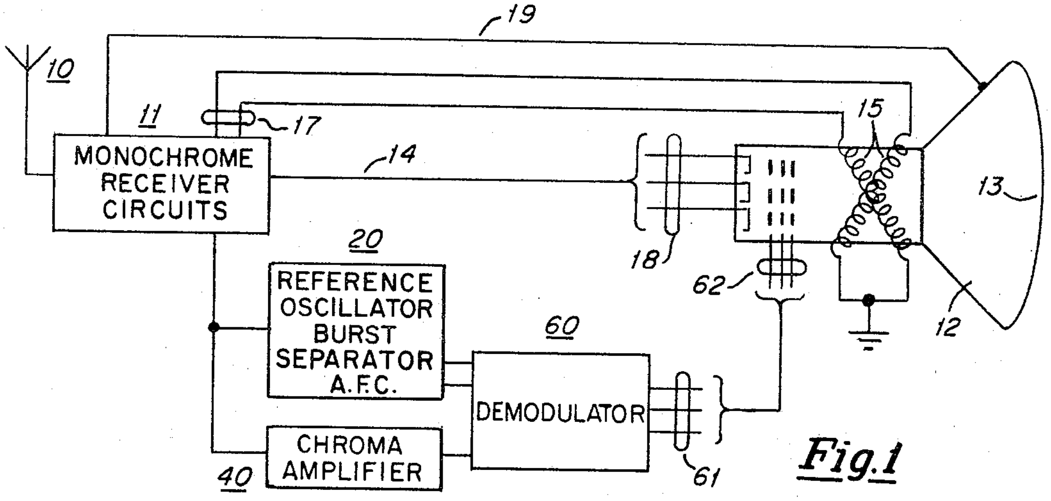
FIGURE 1 is a block diagram of a color television receiver.

Referring now to FIGURE 1, a block diagram of a color television receiver is shown. Since the majority of the circuitry of a color television receiver is functionally identical to the circuitry of a monochrome receiver, this diagram has been simplified by combining these common circuits in a block 11, which is labeled MONOCHROME RECEIVER CIRCUITS. Block 11 is therefore essentially a monochrome television receiver, with appropriate leads running to a picture tube.

Antenna 10 couples received television signal transmissions to block 11, including circuitry (not illustrated) for selecting a particular signal from among those received by antenna 10 and for heterodyning this signal with a locally generated signal to produce an intermediate frequency carrier signal. Circuits in block 11 also amplify the intermediate frequency signal and remove the video and synchronizing information contained therein. Further circuitry in block 11 detects and reproduces the audio signal contained within the received television signal.

The synchronizing information detected in block 11 is utilized to control various other portions of the circuitry of block 11 which develop the horizontal and vertical potentials necessary to scan the electron beams from each of three color guns across the face 13 of a picture tube 12, and for developing the high potential necessary to accelerate these electron beams within picture tube 12.

The usable video information in a monochrome television receiver consists entirely of brightness information, which information is identical to the luminance signal of a colorcast. The Y signal is coupled to the cathodes 18 of the color guns of picture tube 12 over a lead 14. Different signal levels are applied to the different cathodes in accordance with the color makeup of the monochrome signal and phosphor efficiency of the color phosphors. Horizontal and vertical scan potentials developed within the circuitry of block 11 are applied to horizontal and vertical deflection coils 15 over a pair of leads 17. A lead 19 carries high voltage from block 11 to picture tube 12, where it is coupled through an internal connection (not shown) to beam accelerating electrodes (also not shown) in picture tube 12.

Blocks 20, 40 and 60, labeled REFERENCE OSCILLATOR, BURST SEPARATOR, AFC, CHROMA AMPLIFIER, and DEMODULATOR, respectively, comprise the chrominance circuitry of the color television receiver of FIGURE 1. Block 20 supplies 3.58 mc. reference signals to the demodulator of block 60. The 3.58 mc. reference signals, developed by a free running oscillator which is keyed in by the 3.58 mc. bursts in the received signal, are delayed by a predetermined amount to demodulate along selected axes.

Chroma amplifier 40 amplifies the coded color signal and applies it to block 60 for demodulation. The combined effect of the coded color signal and the 3.58 mc. reference signals within block 60 produces, in accordance with the invention, three color difference signals of sufficient amplitude to directly drive the control grids 62 of the picture tube. Each control grid 62 is associated with a respective color gun in picture tube 12 and the applied color difference signals $R-Y$, $B-Y$ and $G-Y$ combine with the monochrome or Y signal on the cathodes 18, resulting in reconstituted R, B, and G color signals.

Figure 2:
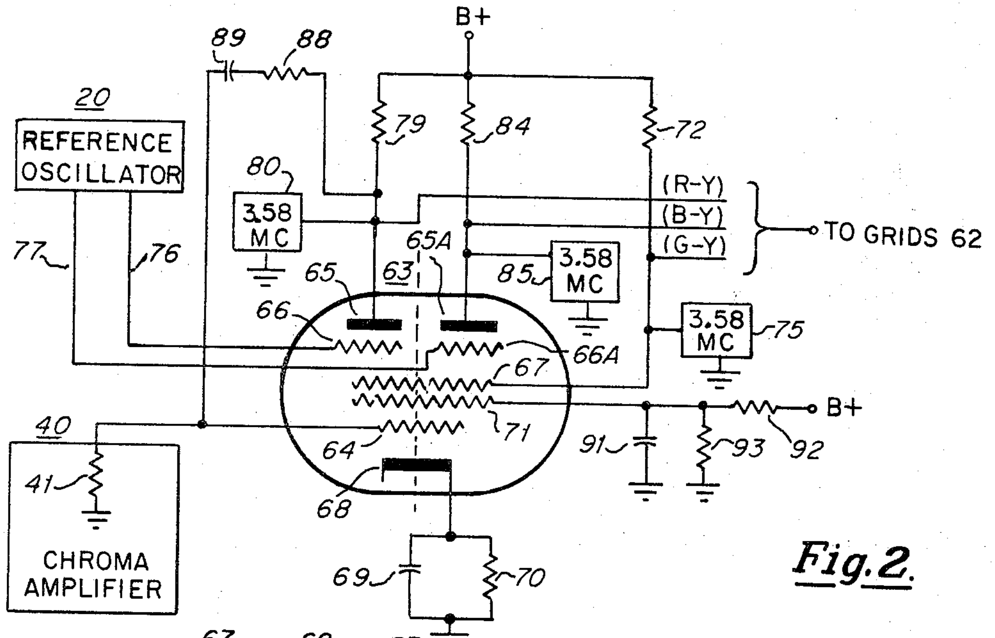
FIGURE 2 is a partial block and partial schematic diagram of the color demodulator portion of a color television set constructed in accordance with the invention.
Figure 3:
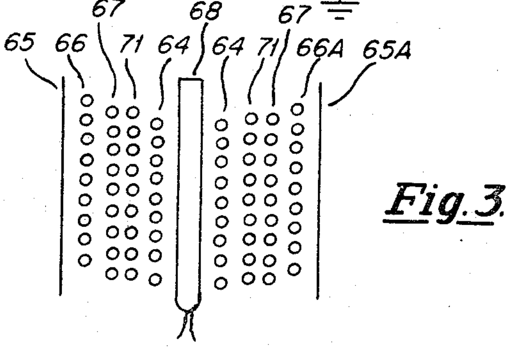
FIGURE 3 is a cutaway representation of the hexode element arrangement of the demodulator tube.

FIGURE 2 is a partial schematic and partial block diagram of the chrominance circuitry of a color television receiver constructed in accordance with the invention. Chroma amplifier 40, the equivalent impedance of which is indicated by a resistor 41, applies the color signal to a common control grid 64 of a twin hexode 63. Twin hexode 63 contains two anodes 65 and **65*a*, two suppressor grids 66 and 66*a*, a common screen grid 67, a common cathode 68, and a common shadow grid 71. Shadow grid 71, as will be more fully described, is juxtaposed with respect to common screen grid 67 and serves to shield it from the electron stream emitted by cathode 68. Shadow grid 71 is maintained at a relatively low positive DC potential by virtue of its connection to the voltage divider consisting of resistors 92 and 93 connected between B+ and ground. A capacitor 91 bypasses shadow grid 71 for signal currents. Cathode 68 is coupled to ground through the parallel combination of a capacitor 69 and resistor 70. Common screen grid 67 is connected to B+ through a load resistor 72. A 3.58 mc. trap 75 removes any reference potential from the output of screen grid 67**.

Anode 65 is connected to B+ through a load resistor 79. A 3.58 mc. trap 80 removes any reference signal from its output. Similarly anode **65*a* is connected to B+ through a load resistor 84 and a 3.58 mc. trap 85** is connected thereacross.

It should be noted that, while a twin hexode is depicted as the color demodulator in this embodiment of the invention, the broader aspects thereof obviously embrace not only twin hexodes but two single hexodes as well. This is indicated in FIGURE 2 by the horizontal dashed line running through twin hexodes 63, dividing the tube into two sections. These sections can be considered either as two halves of a twin hexode, or as two separate hexodes. Besides space savings and economy, an important advantage in using a twin hexode in the preferred embodiment is that the need for frequent resetting of the picture tube grey scale is obviated, because tube characteristics vary with cathode aging and providing only one cathode assures more uniform characteristics. The invention represents an improvement over prior art demodulators, many of which have as many as five separate vacuum tube cathodes with the consequent non-uniform aging associated therewith, and in particular an improvement over the twin pentode demodulator disclosed in a copending application of Lin Kao and Leonard Dietch, Ser. No. 391,206, filed Aug. 21, 1964, now U.S. Patent No. 3,287,493, issued Nov. 22, 1966.

In the above mentioned copending application, the common screen grid in the twin pentode demodulator had a very low impedance due to its relatively large effective "capture area." That is, the screen grid would intercept and capture a large number of electrons flowing from the cathode to the anodes. Consequently, as fully described in the above application, a feedback network was utilized to mix a certain portion of $R-Y$ and $B-Y$ signals (at video frequencies) and reintroduce the signals into the input circuit. The $G-Y$ output was taken from the common screen grid with the lower portion of the demodulator, that is, the cathode, control grid and screen grid, acting as a triode amplifier for video frequencies. In the instant application, the shadow grid greatly reduces the capture effect of the screen grid, and, consequently, the effective impedance of the screen grid is raised considerably. With this arrangement, it is practical to directly derive a usable high level $G-Y$ signal from the screen grid.

In operation, two phase displaced 3.58 mc. reference signals are applied over leads 76 and 77 to suppressor grids 66 and **66*a*, respectively. In accordance with the invention, these reference signals are phase displaced from the color subcarrier and from each other by amounts which result in the direct demodulation of the red and the blue color difference signals. The color information, which comprises two amplitude modulated (by the I and the Q signals) phase displaced suppressed carrier signals, is applied to common control grid 64 of twin hexode 63. The combined effect of the color information on control grid 64 and the reference signals on suppressor grids 66 and 66***a* produces an $(R-Y)$ signal at anode 65 and a $(B-Y)$ signal at anode 65*a*. These signals are conveyed over two of a group of three leads 61 and applied to respective grids 62 of the color guns of picture tube 12 with no further amplification.

In a conventional pentode, the capture effect of the screen grid is so large as to effectively preclude deriving an output signal therefrom of the magnitude required to drive the control grid of the picture tube. As previously mentioned in the above copending application, this defect was overcome by matrixing a portion of the $R-Y$ and $B-Y$ outputs and utilizing the screen grid as an anode of a triode amplifier at video frequencies. In the circuit of the invention, the shadow grid 71 effectively precludes most of the electrons flowing from cathode to anodes from striking the screen grid, and, consequently, the screen grid capture effect is largely overcome. With this arrangement, the suppressor grids 66 and 66*a* more efficiently perform as switches for directing the cathode current flow to the respective anodes. It should be noted that, for example, when anode 65 is rendered conductive, a negative current is induced in screen grid 67. Likewise, when anode 65*a* is rendered conductive, a negative current is induced in screen grid 67. This is true since, assuming no current losses in the other elements, the cathode current must always equal the combined anode and screen grid currents. By reference to equation (4), it will be seen that the effective current induced in screen grid 67 consists of a $-(R-Y)$ potential and a $-(B-Y)$ potential, which is the fundamental makeup of the $G-Y$ signal. It will also be noted that the $G-Y$ signal comprises approximately two and one half times as much $R-Y$ component as $B-Y$ component. Herein lies a problem.

In the above copending application it was described how means were devised to enable the screen grid to function as an output electrode. Since in the pentode demodulator used a great percentage of the cathode current went to the screen grid regardless of the demands of the suppressor and anode, the tube was very ineffective in developing $G-Y$ signal-hence the $G-Y$ signal was developed by feeding back $R-Y$ and $B-Y$ from the anodes (Reflexing) which, while diminishing the anode outputs somewhat, contributed materially to the circuit being commercially acceptable.

With the shadow grid demodulator of the instant invention, excellent $G-Y$ is obtained from the screen grid with the exception that for saturated $G-Y$ signals, a weakness is shown. Since $G-Y$ comprises mostly $-(R-Y)$ it can be seen why there is a problem when the $R-Y$ anode is drawing over twice the current of the $B-Y$ anode. What occurs is that the $R-Y$ side of the demodulator runs into grid-cathode loading.

By a similar technique of reflexing (though on a very greatly diminished scale) this condition may be remedied. Since $-(R-Y)$ is the major component of the $G-Y$ signal, a small amount of feedback of $+(R-Y)$ to the control grid (at video frequency) gives raise to a larger $-(R-Y)$ component on the screen grid by triode action—not detection. Naturally the anode $R-Y$ is decreased somewhat since it too receives a $-(R-Y)$ contribution. There is also a contaminating effect on the $B-Y$ anode which may be eliminated by appropriate readjustment of the axes of demodulation. In the prior pentode demodulator this was essential—in the instant demodulator good performance is obtained without the need for readjusting the demodulation axes since the degree of feedback is so slight.

The feedback circuit is shown in FIGURE 2, and comprises resistor 88 and capacitor 89 connected between anode load resistor 79 and control grid 64. This connection puts a small amount of $+(R-Y)$ signal onto the control grid which appears as an amplified $-(R-Y)$ component on the screen grid. It should be emphasized that the circuit works well without feedback, except for signals denoting maximum saturated "greens." In this case, for optimum performance, the feedback network has proven necessary.

While it sounds untechnical to say that feedback is necessary, but good results are achieved without it, it is really merely recognition of the extreme subjectiveness associated with color television. To make a proper $G-Y$ signal at high levels with the disclosed demodulator it is essential to have feedback—yet only a side by side comparison would reveal the difference in visual quality achieved to a layman.

In FIGURE 4, there is shown an unscaled cross sectional view of the electrode structure of demodulator 63. Cathode 68 occupies a central position and is surrounded by a random wound control grid 64. The shadow grid 71 is spaced from the control grid 64 and directly juxtaposed behind it is found the screen grid 67. Proceeding outwardly, the respective suppressor grids 66 and 66*a* (also random wound) and the anodes 65 and 65*a* complete the electrode complement. In accordance with well-known theory, the shadow grid, also sometimes called a focusing electrode, directs the stream of electrons from cathode to anode between the grid wires of the screen grid, thus markedly reducing the number of electrons the screen grid collects. Since the screen grid no longer receives a large percentage of the cathode current, its effective impedance rises substantially. This rise in effective impedance permits the screen grid to be utilized as a high level demodulator electrode for directly extracting the $G-Y$ signal.

What has been described is an improved high level demodulator for a color television set. It is recognized that those skilled in the art will perceive numerous modifications and changes from the disclosed embodiment of the invention. Therefore the invention is to be limited only by the scope of the claims.

The embodiments of the invention in which an exclusive property or privilege is claimed are defined as follows:

1. Demodulator means for demodulating a coded signal consisting of two phase displaced amplitude modulations of a suppressed carrier, said modulations including matrixed combinations of A information, B information and C information; said demodulator means including two hexode vacuum tube sections having: a primary input electrode; two secondary input electrodes; two primary output electrodes and a secondary output electrode, said secondary output electrode being a screen element having a low impedance; shadow electrode means juxtaposed to said secondary output electrode for increasing the impedance thereof, thereby rendering said secondary output electrode an effective output device; means impressing a first signal on said primary input electrode; means impressing second and third signals on said secondary input electrodes respectively; said first signal on the one hand and said second and third signals on the other hand coacting to accomplish demodulation of said A information and said B information, whereby said A information and said B information appear at respective ones of said primary output electrodes and negatives of said A and said B information appear at said secondary output electrode; and means supplying a portion of the output from one of said primary output electrodes to said primary input electrode for reflex amplification between said primary input electrode and said secondary output electrode to thereby yield said C information at said secondary output electrode.

2. In an electronic apparatus, demodulator means for deriving a first, a second and a third signal from received carrier signals, said third signal being derivable as a function of said first and second signals, said carrier signals being amplitude modulated by an A signal and a B signal which are phase displaced from one another, said demodulating means comprising; vacuum tube means having cathode means, control grid means, screen grid means, shadow grid means located between said control grid means and said screen grid means, first and second suppressor grids and first and second anodes; means applying said carrier signals to either said control grid means or said first and second suppressor grids for synchronous demodulation; oscillator means applying reference signals to the other of either said first and second suppressor grids or said control grid means, said reference signals and said carrier signals being phase displaced such that said first signal is produced at said first anode, said second signal is produced at said second anode, and said third signal is produced at said screen grid means.

3. In a color television receiver, a color demodulator including a single evacuated envelope having a common cathode, a common control grid, a common shadow grid, a common screen grid aligned with said shadow grid, first and second suppressor grids and first and second anodes; first means applying a color information signal to said common control grid, said color information signal comprising a first pair of related color signals amplitude modulated upon a suppressed subcarrier; oscillator means applying reference signals to each of said first and said second suppressor grids for synchronously demodulating said color information signal, said reference signals being phase displaced such that a second pair of related color signals is produced, one of said second pair of related color signals being produced at said first anode and the other one of said second pair of related color signals being produced at said second anode; said screen grid having induced therein negative signals corresponding to the signals produced at said anodes whereby a third color signal is produced at said common screen grid.

4. In a color television receiver, a color demodulator including a twin hexode vacuum tube having a common cathode, a common control grid, a common screen grid, a common shadow grid increasing the effective impedance of said screen grid, first and second suppressor grids, and first and second anodes; first means applying a color information signal to said common control grid, said color information signal comprising a suppressed subcarrier with amplitude modulations representing an I and a Q color signal; oscillator means applying reference signals to each of said first and said second suppressor grids for synchronously demodulating said color information signal, said reference signals being phase displaced such that an $R-Y$ signal is produced at said first anode, a $B-Y$ signal is produced at said second anode, and negative $R-Y$, $B-Y$ current components are induced in said common screen grid, said induced components forming a $G-Y$ signal source at said common screen grid.

5. In a color television receiver, a color demodulator for deriving red, blue and green color difference signals, said color demodulator comprising a twin hexode vacuum tube having a common cathode, a common screen grid, first and second suppressor grids, first and second anodes and a shadow grid shielding said common screen grid; means applying a color information signal to said common control grid, said color information signal comprising a suppressed subcarrier with amplitude modulation representing first and second related color signals; means supplying bursts of synchronizing voltage of the same frequency as said suppressed subcarrier and with a predetermined phase relation to said suppressed subcarrier; oscillator means applying reference signals to each of said first and said second suppressor grids for synchronously demodulating said color information signal, said reference signals being controlled by said synchronizing voltage and being phase displaced from said suppressed subcarrier such that a red color difference signal is produced at said first anode, a blue color difference signal is produced at said second anode, and a green color difference signal is produced at said common screen grid, and means feeding back a small portion of said red color difference signal at said first anode to allow a high level $G-Y$ signal to be taken from said screen grid.

6. A color demodulator as claimed in claim 5 wherein said feedback means comprises a large resistance coupled between said first anode and said common control grid.

7. In a color television receiver, a color demodulator including; first and second hexode vacuum tubes, said first hexode vacuum tube having a first cathode, a first anode, a first control grid, a first screen grid, a first shadow grid shielding said first screen grid and a first suppressor grid, said second hexode vacuum tube having a second cathode, a second anode, a second control grid, a second screen grid, a second shadow grid shielding said second screen grid, and a second suppressor grid; an input circuit common to said first and second control grids; an output circuit common to said first and second screen grids; means maintaining a low DC potential on said shadow grids, means applying a color information signal to said common input circuit, said color information signal comprising a suppressed subcarrier with amplitude modulations representing a pair of related color signals; oscillator means applying reference signals to each of said first and said second suppressor grids for synchronously demodulating said color information signal, said reference signals being phase displaced from said color subcarrier such that a first color signal is produced at said first anode, a second color signal is produced at said second anode, and a third color signal consisting of negative induced first and second color signals is produced in said common output circuit.

8. In a color television receiver, a color demodulator comprising; a twin hexode vacuum tube including, in the order named, a common cathode, a common control grid, a common shadow grid, a common screen grid, first and second suppressor grids and first and second anodes, said shadow grid being juxtaposed close to said screen grid and effectively shielding it from electrons passing from said cathode to said anodes; means applying a coded color signal including $R-Y$ and $B-Y$ information to said common control grid; means applying phase displaced demodulating reference signals to said first and said second suppressor grids respectively, the axes of demodulation being determined by said phase displacement and being selected to produce an $R-Y$ signal at said first anode and a $B-Y$ signal at said second anode; said screen grid having induced therein negative $R-Y$ and $B-Y$ signal currents which effectively make up a $G-Y$ signal; a feedback circuit interconnecting said first anode and said control grid for applying a small amount of $R-Y$ signal to said common control grid thereby augmenting the negative $R-Y$ portion of said $G-Y$ signal on said screen grid; and means coupling said $R-Y$, $B-Y$, and $G-Y$ signals to a color picture tube without intermediate amplification.

References Cited

UNITED STATES PATENTS

| | | | |
|---|---|---|---|
| 2,779,818 | 1/1957 | Adler et al. | 178—5.4 |
| 2,990,445 | 6/1961 | Preisig | 178—5.4 |
| 3,287,493 | 11/1966 | Kao et al. | 178—5.4 |

FOREIGN PATENTS 1,371,462 7/1964 France.

JOHN W. CALDWELL, *Primary Examiner.*

J. A. O'BRIEN, R. MURRAY, *Assistant Examiners.*